(12) United States Patent
Pyle

(10) Patent No.: US 12,637,394 B2
(45) Date of Patent: May 26, 2026

(54) PAPER MULCH GRANULE WITH FERTILIZER FOR IMPROVED SEED ESTABLISHMENT

(71) Applicant: Allen R. Pyle, Green Bay, WI (US)

(72) Inventor: Allen R. Pyle, Green Bay, WI (US)

(73) Assignee: SKYLINE ENCAP HOLDINGS, LLC., Green Bay, WI (US)

( * ) Notice: Subject to any disclaimer, the term of this patent is extended or adjusted under 35 U.S.C. 154(b) by 1017 days.

(21) Appl. No.: 17/839,578

(22) Filed: Jun. 14, 2022

(65) Prior Publication Data

US 2022/0396532 A1 Dec. 15, 2022

Related U.S. Application Data

(60) Provisional application No. 63/210,540, filed on Jun. 15, 2021.

(51) Int. Cl.
| | |
|---|---|
| *A01G 13/35* | (2025.01) |
| *C05F 1/00* | (2006.01) |
| *C05G 3/80* | (2020.01) |
| *C09K 17/52* | (2006.01) |

(52) U.S. Cl.
CPC .............. *C05F 1/005* (2013.01); *A01G 13/35* (2025.01); *C05G 3/80* (2020.02); *C09K 17/52* (2013.01)

(58) Field of Classification Search
None
See application file for complete search history.

(56) References Cited

U.S. PATENT DOCUMENTS

| | | | | |
|---|---|---|---|---|
| 4,369,597 A | * | 1/1983 | Leep ...................... | C09K 17/52 47/9 |
| 6,021,598 A | * | 2/2000 | Holton ................... | C09K 17/52 47/9 |
| 6,349,499 B1 | * | 2/2002 | Spittle ................... | C09K 17/52 47/9 |
| 6,508,965 B1 | * | 1/2003 | Webb ........................ | C10L 5/44 366/85 |
| 6,523,299 B2 | * | 2/2003 | Morris ................... | A01G 13/35 47/9 |
| 7,357,946 B2 | * | 4/2008 | Adamoli, Jr. ............. | B09C 1/08 47/57.6 |
| 8,020,342 B2 | * | 9/2011 | Karpik ................... | A01G 13/35 47/9 |
| 10,774,013 B2 | * | 9/2020 | Hignight ................ | A01G 13/35 |

FOREIGN PATENT DOCUMENTS

| | | | | | |
|---|---|---|---|---|---|
| CA | | 2298889 A1 | * | 8/2000 | .......... C04B 18/241 |
| CA | | 2840025 C | * | 11/2021 | .......... A01K 1/0155 |
| WO | WO-2005102965 A1 | * | 11/2005 | | .............. C05F 1/005 |

* cited by examiner

*Primary Examiner* — Magdalena Topolski

(74) *Attorney, Agent, or Firm* — Philip M. Weiss; WEISS & WEISS

(57) ABSTRACT

A homogenous granular paper mulch including fertilizer (with the fertilizer composed of natural and/or conventional synthetic ingredients). The mulch is a granular solid composed of recycled paper, fertilizer, and water. The granular product is easy to handle and apply and provides an improved environment for germinating seed.

10 Claims, No Drawings

PAPER MULCH GRANULE WITH FERTILIZER FOR IMPROVED SEED ESTABLISHMENT

RELATED APPLICATIONS

This application claims benefit to and priority of provisional application Ser. No. 63/210,540 filed Jun. 15, 2021.

FIELD OF THE INVENTION

The present invention relates to an improved granular mulching material from recycled paper or other cellulosic material that also includes natural and/or synthetic fertilizer, resulting in an easy-to-apply, homogeneous pelletized mulch that improves seed germination and seedling establishment while recycling waste products that would otherwise enter the waste stream.

BACKGROUND OF THE INVENTION

A range of factors can impact successful establishment of seeds sown directly in an outdoor environment. Environmental factors such as soil characteristics, soil moisture, rainfall, and temperature have significant impacts on the success of any given planting of seeds.

Mulch is widely recognized as a technique to improve seed establishment. Mulch can help to reduce erosion of bare soil, washing away of seeds after planting, and retaining moisture around germinating seeds, all of which can improve seedling establishment. A wide range of mulching materials are commonly used, including spread straw and batts or mats made from straw. Waste products, such as paper or cardboard and wood fiber wastes can be utilized as mulching materials, creating a value-added product that removes recyclable materials from the waste stream.

SUMMARY OF THE INVENTION

The present invention creates an improved granular mulching material from recycled paper or other cellulosic material (cardboard, wood waste products, and other plant-based waste products) plus natural and/or synthetic fertilizer, resulting in an easy-to-apply, homogeneous pelletized mulch that improves seed germination and seedling establishment while recycling waste products that would otherwise enter the waste stream. It is an object of the present invention for the granular mulch to be suitable for use with a wide range of plants, including but not limited to turfgrass, ornamental plants, and edible plants including herbs and vegetables.

Combining recycled paper with fertilizer (including natural and/or conventional synthetic fertilizer ingredients) into a homogeneous pellet or granule serves to create a novel, ecologically friendly mulching product with benefits to seed germination and seedling establishment. The present invention combines both recycling of waste products and upcycling the waste products to create a value-added beneficial mulching pellet.

It is an object of the present invention for the granular mulch material to be used with slow-release organic fertilizers. It is an object of the present invention for the granular mulch to be used with conventional fertilizers.

It is an object of the present invention for the granular mulch material and fertilizer to further comprise surfactants.

It is an object of the present invention for the granular mulch and fertilizer product to have an irregular shape.

It is an object of the present invention to add a pigment to the granular mulch and fertilizer product.

It is an object of the present invention for the granular mulch product to comprise paper, fertilizer and water.

The present invention relates to a method for preparing a granular mulch product comprising comminuting paper, mixing the comminuting paper with water to form a pulp, and blending in fertilizer. This creates a pulp that is extruded through a die orifice. The extrudate is chopped to a length of less than about ¼ inch to form granules. The granules are further treated with a crumbling equipment to partially shred the extruded granules (producing irregular and rough edges that help to prevent seed separation), and drying the granules to a final moisture content of about 6% to about 13% by weight. The resulting granular product is easy to handle and apply.

It is an object of the present invention for the granular mulch to comprise recycled paper granule with pelletized natural fertilizer, where the fertilizer added is a homogeneous pelletized or granulated product. It is an object of the present invention for the fertilizer to comprise dairy manure digestate and limestone blend, feather meal, gypsum, bentonite clay, zeolite, sulfate of potash, and guar gum. It is art object of the present invention for the manure granule to be added to the paper and water slurry before extrusion. It is an object of the present invention for the resulting product to have a bulk density of approximately 13.5 pounds per cubic foot. It is an object of the present invention for the granule to be colored with a green pigment or dye to make it stand out after application on bare soil, or blend into turf when applied to bare spots in lawns.

It is an object of the present invention for the granular mulch to comprise a recycled paper granule enhanced with pelletized natural fertilizer comprised of dehydrated dairy manure, dehydrated poultry manure, and feather meal and sufficient binding material for ensuring good pelletization. It is an object of the present invention for the fertilizer granule to be added to the paper and water slurry before extrusion. It is an object of the present invention for the granule to be colored with a green pigment or dye to make it stand out after application on bare soil, or blend into turf when applied to bare spots in lawns.

It is an object of the present invention to add a fertilizer (organic and/or synthetic) as a separate ingredient blended into the paper granules.

DETAILED DESCRIPTION OF THE INVENTION

The nature of the mulch granule facilitates nutrient release from slow-release organic fertilizers, as the granule readily absorbs moisture, creating and maintaining moist conditions that promote microbial activity, facilitating the release of nutrients from slow release natural fertilizers while creating a beneficial environment for seed germination. For conventional fertilizer, the mulch helps to hold the fertilizer close to seeds, so it can be easily available to growing seedlings.

Surfactant in the granules helps to ensure rapid and thorough wetting of the granule after rain or irrigation.

The irregular nature of the granular product ensures that when it is combined with seed in a bagged or otherwise containerized product the seed does not segregate or separate from the mulch. In addition, compared to a mulch granule blended with fertilizer, it is impossible for fertilizer to migrate and separate in bag, which can be a problem with blended mulch products. The homogeneous nature of the granule ensures fertilizer is retained where it is needed to fuel vigorous plant growth. Nutrients are held and released in close proximity to germinating seed.

Manufacture

The mulch is a granular solid comprising at least about 65% to 80% paper by weight, at least about 5% to 15% fertilizer by weight, and at least about 6% water by weight. The resulting product has a bulk density between 12 and 16 pounds per cubic foot.

Surfactants are included in an amount sufficient to enhance water absorption, in the range of 0.1% to 0.5% by weight. A range of surfactant types are suitable, including anionic surfactants, nonionic surfactants, cationic surfactants, and amphoteric surfactants.

The product is prepared by comminuting paper, mixing the comminuting paper with water to form a pulp, blending in the fertilizer ingredient(s), extruding the pulp through a die orifice, chopping the extrudate to a length of less than about ¼ inch to form granules, further treating the granules with a crumbling equipment to partially shred the extruded granules (producing irregular and rough edges that help to prevent seed separation), and drying the granules to a final moisture content of about 6% to about 13% by weight. The resulting granular product is easy to handle and apply.

EXAMPLE 1

A recycled paper granule enhanced with about 10% pelletized natural fertilizer, where the fertilizer added is a homogeneous pelletized or granulated product composed of about 58.5% dairy manure digestate and limestone blend, 23.25% feather meal, 9% gypsum, 6% bentonite clay, 1.5% zeolite, 1% sulfate of potash, and 0.75% guar gum. The manure granule is added to the paper and water slurry before extrusion. The resulting product has a bulk density of approximately 13.5 pounds per cubic foot. The granule can optionally be colored with a green pigment or dye to make it stand out after application on bare soil, or blend into turf when applied to bare spots in lawns.

The recycled paper granule can be enhanced with 9%-11% pelletized natural fertilizer, where the fertilizer added is a homogeneous pelletized or granulated product composed of 57.5%-59.5% dairy manure digestate and limestone blend, 22.25%-24.25% feather meal, 8%-10% gypsum, 5%-7% bentonite clay, 1%-2% zeolite, 0.5%-1.5% sulfate of potash and 0.5%-1% guar gum. The resulting bulk density is between 12.5-14.5 pounds per cubic inch.

EXAMPLE 2

A recycled paper granule enhanced with about 12% pelletized natural fertilizer composed of 47.75% dehydrated dairy manure, 27.25% dehydrated poultry manure, and 25% feather meal and sufficient binding material for ensuring good pelletization. The fertilizer granule is added to the paper and water slurry before extrusion. The granule can optionally be colored with a green pigment or dye to make it stand out after application on bare soil, or blend into turf when applied to bare spots in lawns.

The recycled paper granule can be enhanced with 11%-13% pelletized natural fertilizer composed of 46.75%-48.75% dehydrated dairy manure, 26.25%-28.25% dehydrated poultry manure, and 24%-26% feather meal.

The invention claimed is:

1. A method for preparing a granular mulch comprising:
   comminuting paper;
   mixing said comminuting paper with water to form a pulp;
   blending in fertilizer with said pulp;
   extruding said pulp through a die orifice to form an extrudate;
   chopping said extrudate to a length of less than ¼ inch to form extruded granules;
   treating said granules with a crumbling equipment to partially shred said granules to produce irregular and rough edges to prevent seed separation; and
   drying said granules to a final moisture content of between 6% to 13% by weight.

2. The method of claim 1 wherein said granular mulch comprises recycled paper granule with pelletized natural fertilizer, where said fertilizer added is a homogeneous pelletized or granulated product.

3. The method of claim 2 wherein said fertilizer comprises dairy manure digestate and limestone blend, feather meal, gypsum, bentonite clay, zeolite, sulfate of potash, and guar gum.

4. The method of claim 1 wherein resulting product has a bulk density of about 13.5 pounds per cubic foot.

5. The method of claim 1 further comprising adding a green pigment or dye to said granule to make it stand out after application on bare soil, or blend into turf when applied to bare spots in lawns.

6. The method of claim 1 wherein said granular mulch comprises a recycled paper granule enhanced with pelletized natural fertilizer comprised of dehydrated dairy manure, dehydrated poultry manure, and feather meal and sufficient binding material for ensuring pelletization.

7. The method of claim 1 wherein said fertilizer granule is added to said paper and water slurry before extrusion.

8. The method of claim 1 wherein irregular nature of said granular product ensures that when it is combined with seed in a bagged or containerized product, said seed does not segregate or separate from said mulch.

9. The method of claim 8 wherein when said mulch granule is blended with fertilizer, said fertilizer does not migrate and separate in said bag.

10. The method of claim 1 wherein homogeneous nature of said granule ensures fertilizer is retained where it is needed to fuel plant growth, and nutrients are held and released in close proximity to germinating seed.

* * * * *